(12) United States Patent
Kitahata et al.

(10) Patent No.: US 9,096,218 B2
(45) Date of Patent: Aug. 4, 2015

(54) CONTROL DEVICE OF VEHICLE POWER TRANSMISSION DEVICE

(75) Inventors: Takeshi Kitahata, Toyota (JP); Tatsuo Obata, Toyota (JP); Hiromichi Kimura, Okazaki (JP); Takeshi Kuwahara, Nisshin (JP); Toru Saito, Toyota (JP); Masahiro Tanae, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 323 days.

(21) Appl. No.: 13/699,009

(22) PCT Filed: May 21, 2010

(86) PCT No.: PCT/JP2010/058674
§ 371 (c)(1),
(2), (4) Date: Feb. 1, 2013

(87) PCT Pub. No.: WO2011/145221
PCT Pub. Date: Nov. 24, 2011

(65) Prior Publication Data
US 2013/0131941 A1  May 23, 2013

(51) Int. Cl.
*B60W 10/12* (2012.01)
*B60K 6/38* (2007.10)
*B60K 6/40* (2007.10)
(Continued)

(52) U.S. Cl.
CPC .................. *B60W 10/12* (2013.01); *B60K 6/38* (2013.01); *B60K 6/40* (2013.01); *B60K 6/445* (2013.01); *B60W 10/08* (2013.01); *B60W 30/1846* (2013.01); *B60W 30/20* (2013.01); *F16F 15/1297* (2013.01); *B60W 2030/206* (2013.01); *B60W 2510/0241* (2013.01); *B60W 2710/025* (2013.01); *B60W 2710/081* (2013.01); *F02N 11/04* (2013.01); *F16D 43/215* (2013.01); *Y02T10/6239* (2013.01); *Y02T 10/7258* (2013.01); *Y10T 477/23* (2015.01); *Y10T 477/33* (2015.01)

(58) Field of Classification Search
CPC ..... B60W 10/12; B60W 10/08; B60W 30/20; B60W 30/1846; B60W 30/184
USPC .............................................. 701/58; 477/15
See application file for complete search history.

(56) References Cited

U.S. PATENT DOCUMENTS 5,890,994 A    4/1999  Sawamura et al.
6,655,485 B1  12/2003  Ito et al.
(Continued)

FOREIGN PATENT DOCUMENTS

EP    2 127 984 A1   12/2009
JP    9-296744       11/1997
(Continued)

*Primary Examiner* — Helal A Algahaim
*Assistant Examiner* — Nga X Nguyen
(74) *Attorney, Agent, or Firm* — Finnegan, Henderson, Farabow, Garrett & Dunner, LLP

(57) ABSTRACT

It is provided a control device of a vehicle power transmission device including: a torque limiter device blocking transmission of a torque amount exceeding a predetermined torque with operation involving differential rotation between a first rotating member and a second rotating member; and an electric motor coupled to one of the first rotating member and the second rotating member in a power transmittable manner, wherein when a rotation speed difference is generated between the first rotating member and the second rotating member due to the operation of the torque limiter device, the electric motor is operated so as to suppress the rotation speed difference.

14 Claims, 9 Drawing Sheets

(51) Int. Cl.
*B60K 6/445* (2007.10)
*B60W 30/184* (2012.01)
*B60W 10/08* (2006.01)
*B60W 30/20* (2006.01)
*F16F 15/129* (2006.01)
*F02N 11/04* (2006.01)
*F16D 43/21* (2006.01)

(56) References Cited

U.S. PATENT DOCUMENTS

| | | | |
|---|---|---|---|
| 2004/0060753 A1 | 4/2004 | Ito et al. | |
| 2005/0082098 A1 | 4/2005 | Ito et al. | |
| 2006/0086545 A1 | 4/2006 | Ito et al. | |
| 2006/0090940 A1 | 5/2006 | Ito et al. | |
| 2009/0071733 A1* | 3/2009 | Duan et al. | 180/65.21 |
| 2010/0121512 A1* | 5/2010 | Takahashi et al. | 701/22 |

FOREIGN PATENT DOCUMENTS

| | | |
|---|---|---|
| JP | 2001-112118 | 4/2001 |
| JP | 2008-64281 | 3/2008 |
| JP | 2008-162315 | 7/2008 |
| JP | 2009-184396 | 8/2009 |
| JP | 2011-202775 | 10/2011 |
| WO | WO 2012/008020 A1 | 1/2012 |

* cited by examiner

FIG.6
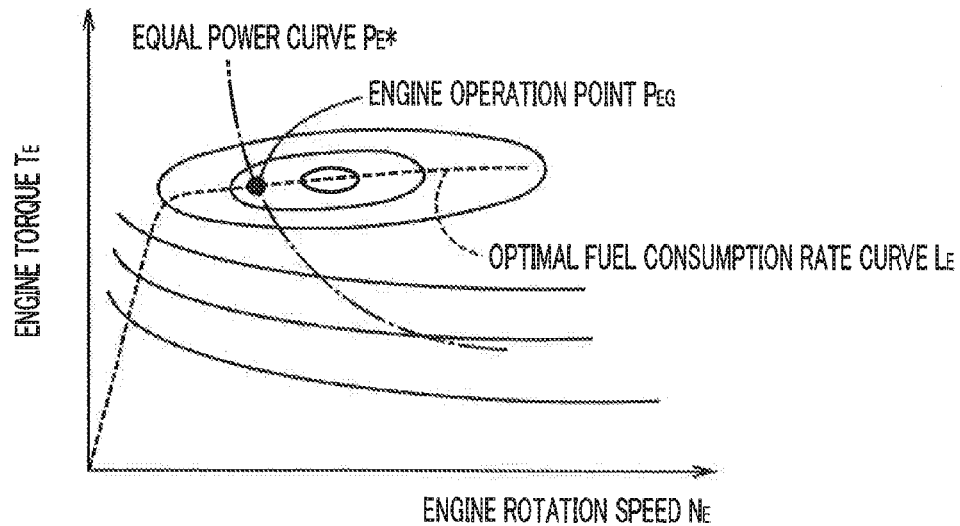
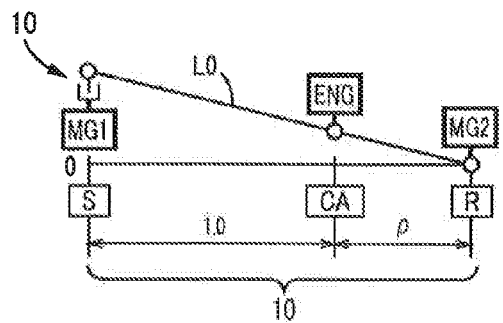
FIG.7(a)
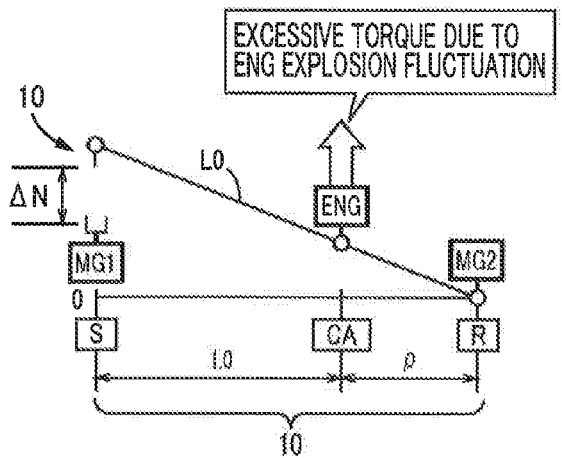
FIG.7(b)

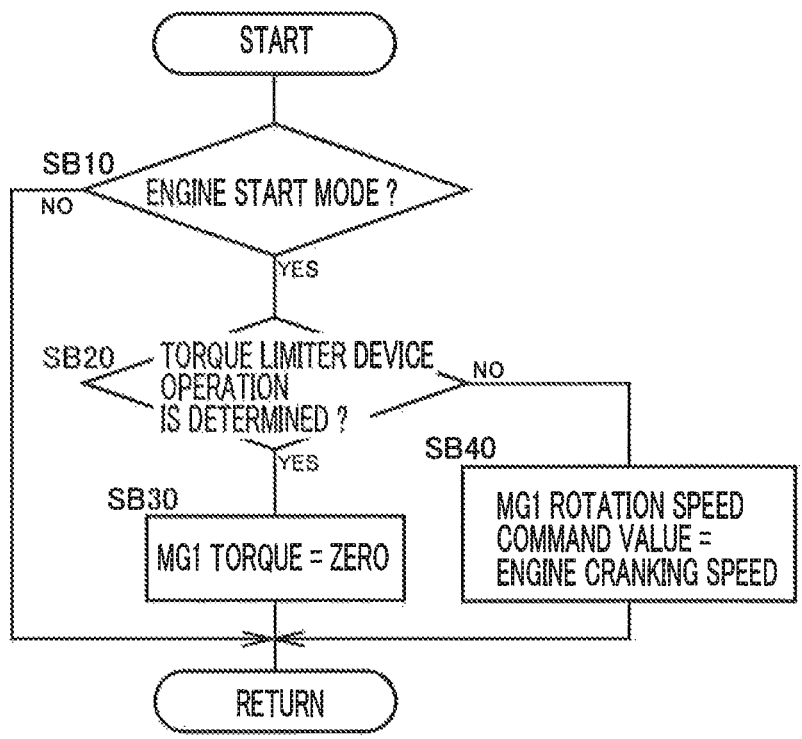

CONTROL DEVICE OF VEHICLE POWER TRANSMISSION DEVICE

CROSS-REFERENCE TO RELATED APPLICATIONS

This application is a national phase application of International Application No., filed PCT/JP2010/058674, the content of which is incorporated herein by reference.

TECHNICAL FIELD

The present invention relates to a control device of a vehicle power transmission device including a torque limiter device and an electric motor coupled to the torque limiter device in a power transmittable manner.

BACKGROUND ART

A vehicle power transmission device is well known that includes a torque limiter device blocking transmission of a torque amount exceeding a predetermined torque with operation involving differential rotation between a first rotating member and a second rotating member and an electric motor coupled to one of the first rotating member and the second rotating member in a power transmittable manner. For example, this corresponds to a driving force distribution device described in Patent Document 1. Patent Document 1 describes that a friction clutch acting as a torque limiter device is disposed between a motor and a planetary carrier to allow differential rotation between the motor and the planetary carrier by releasing a reverse input torque from the drive wheel side to the planetary gear depending on magnitude of the torque so as to alleviate the impact acting on the planetary gear. As described above, to protect members making up a power transmission mechanism such as a transmission from excessive torque disturbance associated with rotation fluctuation of drive wheels due to, for example, explosion fluctuation of an engine or sudden braking, the torque limiter device blocks transmission of a torque amount exceeding a predetermined torque so as to prevent such an excessive torque from acting on the power transmission mechanism.

PRIOR ART DOCUMENTS

Patent Documents

Patent Document 1: Japanese Laid-Open Patent Publication No. 2008-64281
Patent Document 2: Japanese Laid-Open Patent Publication No. 2009-184396

SUMMARY OF THE INVENTION

Problems to be Solved by the Invention

The torque limiter device blocks transmission of a torque amount exceeding a predetermined torque with operation involving differential rotation between one rotating member and the other rotating member making up a friction clutch and heat is generated during operation of the torque limiter device due to friction heat generated between the members. Therefore, strength design of friction materials must be performed to achieve a heat capacity resistant to a generated heat quantity of the friction heat generated when the torque limiter device operates. On the other hand, the generated heat quantity is dependent on magnitude of rotation speed difference during operation of the torque limiter device and an operating time of the torque limiter device, for example, and the magnitude of rotation speed difference and the operating time are dependent on magnitude and duration time of input excessive torque. Since the excessive torque is dependent on, for example, a vehicle running state, such as how the brake pedal is pressed and an operating status of a known ABS for preventing wheels from slipping at the time of braking, and environmental characteristics, such as model variations of engine and output variations due to temperature, it is difficult to reduce the generated heat quantity. Therefore, problems may occur that a design heat capacity of a torque limiter device is hardly reduced and that the cost of the torque limiter device is hardly lowered. The problems as described above are not known.

The present invention was conceived in view of the situations and it is therefore an object of the present invention to provide a control device of a vehicle power transmission device capable of reducing a design heat capacity of a torque limiter device.

Means for Solving the Problems

To achieve the object, the present invention provides a control device of a vehicle power transmission device (a) comprising: a torque limiter device blocking transmission of a torque amount exceeding a predetermined torque with operation involving differential rotation between a first rotating member and a second rotating member; and an electric motor coupled to one of the first rotating member and the second rotating member in a power transmittable manner, wherein (b) when a rotation speed difference is generated between the first rotating member and the second rotating member due to the operation of the torque limiter device, the electric motor is operated so as to suppress the rotation speed difference.

The Effects of the Invention

Consequently, when the rotation speed difference is generated between the first rotating member and the second rotating member due to operation of the torque limiter device, the electric motor is operated to suppress the rotation speed difference and, therefore, for example, the rotation speed difference in the operation state of the torque limiter device can be reduced or the operating time of the torque limiter device can be shortened, thereby suppressing the generated heat quantity of the friction heat generated during operation of the torque limiter device. Therefore, the design heat capacity of the torque limiter device can be made smaller. As a result, the strength design of the friction materials of the torque limiter device can be simplified and the cost of the torque limiter device can be reduced.

Preferably, a differential mechanism is comprised that including three rotating elements of a first rotating element coupled to a drive force source in a power transmittable manner, a second rotating element coupled to the electric motor in a power transmittable manner, and a third rotating element coupled to drive wheels in a power transmittable manner. Consequently, the electric motor can be operated to suppress the rotation speed difference during operation of the torque limiter device without effect of the inertia of the drive force source and the generated heat quantity of the friction heat generated during operation of the torque limiter device is appropriately suppressed in the vehicle power transmission device including the differential mechanism distributing the power of the drive force source to the electric motor side and the drive wheel side, for example.

Preferably, the torque limiter device is disposed between the electric motor and the second rotating element. That is, the electric motor is coupled via the torque limiter device to the second rotating element. Consequently, the drive force source torque input to the torque limiter device is reduced due to the effect of the differential mechanism as compared to the case of disposing the torque limiter device between the drive force source and the first rotating element, for example. Therefore, the cost of the friction materials of the torque limiter device dependent on a transmission torque capacity can be reduced, for example. For example, as compared to the case of coupling the electric motor via the differential mechanism to one of the first rotating member and the second rotating member of the torque limiter device in a power transmittable manner, the electric motor is more easily operated to suppress the rotation speed difference during operation of the torque limiter device.

Preferably, the operation of the torque limiter device is determined based on a rotation speed difference between an actual rotation speed of the electric motor and a rotation speed of the second rotating element calculated from correlation of rotation speeds of the first to third rotating elements, and wherein if the operation of the torque limiter device is determined, the electric motor is operated such that the actual rotation speed of the electric motor is varied to the calculated rotation speed of the second rotating element. Consequently, the electric motor can more appropriately be operated to suppress the rotation speed difference during operation of the torque limiter device toward zero, for example.

Preferably, an electric motor for running coupled to the drive wheels in a power transmittable manner is further comprised, wherein when the electric motor is operated so as to suppress the rotation speed difference, output of the electric motor for running is suppressed. Consequently, for example, in the vehicle power transmission device including the differential mechanism distributing the power of the drive force source to the electric motor side and the drive wheel side and the electric motor for running capable of being driven by using the generated electric power of the electric motor generated from the power of the drive force source, the electric motor can be operated to suppress the rotation speed difference during operation of the torque limiter device without effect of the inertia of the drive force source and the generated heat quantity of the friction heat generated during operation of the torque limiter device is appropriately suppressed. While the electric motor is operated to suppress the rotation speed difference during operation of the torque limiter device, for example, the electric generation by the electric motor is suppressed or the electric motor cannot generate electricity because of the power running of the electric motor and for example, if the electric motor for running is driven in this state, more electric power is used from the battery (the electric storage device) or only the electric power from the battery is used and, in this regard, since the output from the electric motor for running is suppressed, the power consumption of the battery can be suppressed. When the differential action of the differential mechanism is used for mechanically transmitting a main portion of the power from the drive force source to the drive wheels and for electrically transmitting the remaining portion of the power from drive force source the by using the electric path from the electric motor to the electric motor for running and the battery, the differential mechanism can be allowed to function as an electric stepless transmission with a gear ratio changed electrically.

Preferably, the differential mechanism is a planetary gear device having three rotating elements of a sun gear, a carrier, and a ring gear, and wherein the three rotating elements are the first to third rotating elements. Consequently, the differential mechanism is reduced in dimension in the shaft center direction, for example. The differential mechanism is simply made up of the planetary gear device.

Preferably, the differential mechanism has a differential state controlled by controlling an operating state of the electric motor. Consequently, for example, in the vehicle power transmission device allowing the differential mechanism to function as an electric stepless transmission, the generated heat quantity of the friction heat generated during operation of the torque limiter device is appropriately suppressed.

Preferably, the drive force source is an engine, wherein the electric motor has a function as a starting motor rotationally driving the engine during start of the engine, wherein if the torque limiter device is in operation during the start of the engine, an output torque of the electric motor for rotationally driving the engine is reduced toward zero. Consequently, for example, although the separation of the electric motor from the engine inertia may cause the runaway of the electric motor if the torque limiter device is activated in association with engine explosion (ignition) at the start of the engine when the engine is rotationally driven by the electric motor, the reduction of the output torque of the electric motor toward zero suppresses the runaway of the electric motor and unnecessary power consumption is suppressed in the battery supplying electric power to the electric motor.

Preferably, during the start of the engine, the operation of the torque limiter device is determined based on whether a predetermined value is exceeded by an actual value of a rotation speed change rate of the electric motor when the engine is rotationally driven by the electric motor, and wherein if the operation of the torque limiter device is determined, the output torque of the electric motor is reduced toward zero. Consequently, for example, as compared to the case of determining the operation of the torque limiter device based on the rotation speed difference between the actual rotation speed of the electric motor and the rotation speed of the second rotating element calculated from the correlation of rotation speeds of the first to third rotating elements, i.e., for example, as compared to the determination of the operation using various signals exchanged through multiplex communication, the operation can be determined by using the signal concluded by only the electric motor, resulting in earlier determination of the operation of the torque limiter device. Therefore, the runaway of the electric motor is further suppressed and the unnecessary power consumption is further suppressed in the battery supplying electric power to the electric motor.

BRIEF DESCRIPTION OF THE DRAWINGS

FIG. 6 is a diagram of an example of an optimal fuel consumption rate curve of the engine.

FIG. 7 is a diagram of an example depicted on a collinear diagram in the case of input of an excessive engine explosion torque.

FIG. 12 is a flowchart for explaining a main portion of the control operation of the electronic control device, i.e., the control operation for suppressing the runaway of the first electric motor at the start of the engine.

MODES FOR CARRYING OUT THE INVENTION

Preferably, an engine, i.e., an internal combustion engine, such as a gasoline engine and a diesel engine is widely used as the drive force source. The electric motor for running etc., may be used as an auxiliary drive force source in addition to the engine.

Preferably, the torque limiter device is desirably disposed between the electric motor and the second rotating element; however, the torque limiter device may have a form disposed between the drive force source and the second rotating element.

Preferably, the vehicle power transmission device is desirably configured to include the differential mechanism; however, the vehicle power transmission device may have a form configured to include a transmission mechanism such as a planetary gear type automatic transmission, a belt type continuously variable transmission, and a traction type continuously variable transmission instead of this differential mechanism. If the vehicle power transmission device is configured to include such a transmission mechanism, for example, the torque limiter device is disposed between the drive force source and the transmission mechanism and the electric motor is coupled in a power transmittable manner to a rotating member of the torque limiter device closer to the drive force source.

Embodiments of the present invention will now be described in detail with reference to the drawings.

First Embodiment

Figure 1:
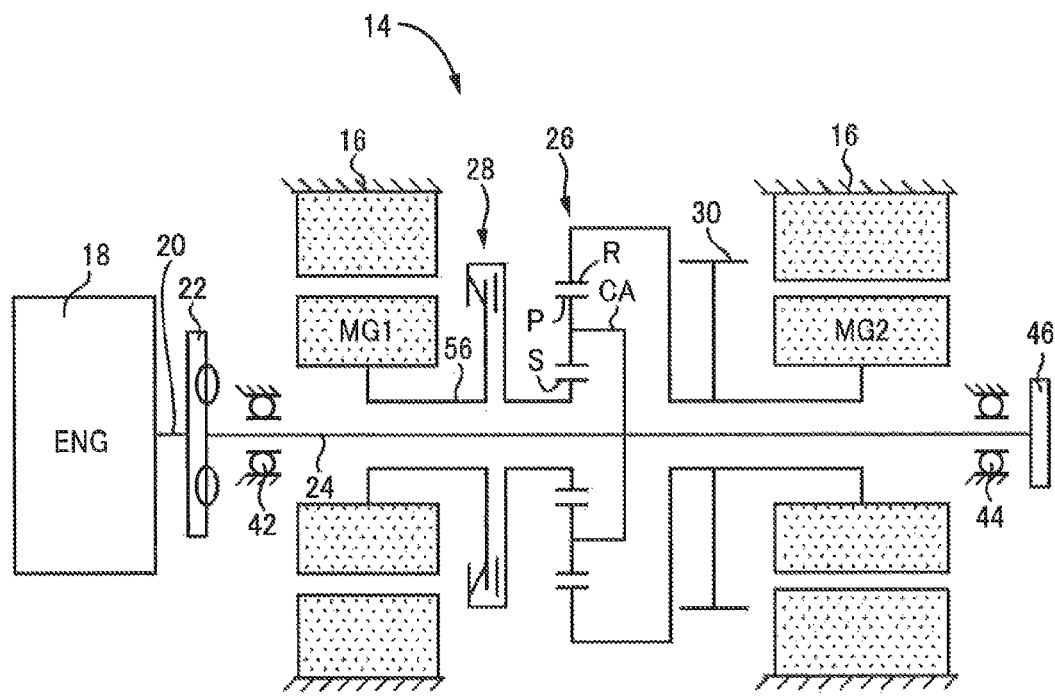
FIG. 1 is a schematic for explaining an example of a transmission mechanism disposed on a vehicle to which the present invention is applied.

FIG. 1 is a schematic for explaining a transmission mechanism 14 making up a portion of a vehicle power transmission device (hereinafter, the power transmission device) 12 disposed on a vehicle 10 (see FIG. 5) to which the present invention is applied. In FIG. 1, the transmission mechanism 14 includes a damper 22 operably coupled to a crankshaft 20 that is an output shaft of an engine 18 and absorbing pulsation due to torque fluctuations etc., from the engine 18; an input shaft 24 rotationally driven via the damper 22 by the engine 18; a first electric motor MG1; a planetary gear device 26 acting as a power distribution mechanism; and a second electric motor MG2, in a transaxle (T/A) case 16 (hereinafter, the case 16) acting as a non-rotating member attached to a vehicle body, in series from the side of the engine 18 that is, for example, an internal combustion engine such as a gasoline engine and a diesel engine acting as a drive force source for running. The transmission mechanism 14 additionally includes a torque limiter device 28 disposed between the first electric motor MG1 and the planetary gear device 26 in the direction of a shaft center C1 (see FIG. 3) of the input shaft 24 so as to enable transmission of torque within a predetermined torque range therebetween.

The power transmission device 12 is preferably used for example, an FF (front-engine front-drive) type vehicle with the power transmission device 12 transversely placed in the vehicle 10 and includes the transmission mechanism 14, a counter gear pair 32 having one gear made up of an output gear 30 acting as an output rotating member of the transmission mechanism 14, a final gear pair 34, a differential gear device (final reduction gear) 36, and a pair of axles 38, etc. The power of the engine 18 is sequentially transmitted via the transmission mechanism 14, the counter gear pair 32, the final gear pair 34, the differential gear device (final reduction gear) 36, and the pair of the axles 38, etc., to a pair of drive wheels 40 (see FIG. 5).

The input shaft 24 is rotatably supported at both ends by ball bearings 42 and 44 and is rotationally driven by the engine 18 since one end is coupled via the damper 22 to the engine 18. The other end is coupled to an oil pump 46 acting as a lubrication oil supplying device and the oil pump 46 is rotationally driven by rotationally driving the input shaft 24, supplying lubrication oil to the portions of the power transmission device 12 such as the planetary gear device 26, the counter gear pair 32, the final gear pair 34, and the ball bearings 42 and 44.

The planetary gear device 26 is a single pinion type planetary gear device having a predetermined gear ratio $\rho$ and includes a sun gear S, a pinion gear P, a carrier CA supporting the pinion gear P in a rotatable and revolvable manner, and a ring gear R engaging via the pinion gear P with the sun gear S, as rotating elements. When ZS denotes the number of teeth of the sun gear S and ZR denotes the number of teeth of the ring gear R, the gear ratio $\rho$ is ZS/ZR. The planetary gear device 26 is a mechanical mechanism mechanically distributing the output of the engine 18 transmitted to the input shaft 24 and distributes the power of the engine 18 to the first electric motor MG1 and the output gear 30. Therefore, in this planetary gear device 26, the carrier CA is coupled to the input shaft 24, i.e., the engine 18 in a power transmittable manner; the sun gear S is coupled to the first electric motor MG1 in a power transmittable manner; and the ring gear R is coupled to the output gear 30. Since the three rotating elements of the planetary gear device 26, i.e., the sun gear S, the carrier CA, and the ring gear R are allowed to rotate relative to each other and are put into a differential state where a differential action is made operative, i.e., the differential action is achieved, the output of the engine 18 is distributed to the first electric motor MG1 and the output gear 30, and since the first electric motor MG1 generates electricity from the output of the engine 18 distributed to the first electric motor MG1 and the generated electric energy is accumulated or the second electric motor MG2 is rotationally driven by the electric energy, the transmission mechanism 14 is put into, for example, a stepless shifting state (electric (NT state), functioning as an electric stepless transmission with the rotation of the output gear 30 continuously varied regardless of a predetermined rotation of the engine 18.

As described above, the transmission mechanism 14 is an electric differential portion, i.e., an electric stepless transmission, having the planetary gear device 26 as a differential mechanism coupled to the engine 18 in a power transmittable manner and the first electric motor MG1 as a differential electric motor coupled to the planetary gear device 26 in a power transmittable manner such that the differential state of the planetary gear device 26 is controlled by controlling the operating state of the first electric motor MG1. The transmission mechanism 14 includes the second electric motor MG2 operably coupled to and integrally rotating with the output gear 30 so as to function as a drive force source for running. Therefore, the second electric motor MG2 is an electric motor for running coupled to the drive wheels 40 in a power transmittable manner. Although the first electric motor MG1 and the second electric motor MG2 of this embodiment are so-called motor generators also having an electric generation function, the first electric motor MG1 at least has a generator (electric generation) function for generating a reactive force and the second electric motor MG2 at least has a motor (electric motor) function for outputting a drive force as a drive force source for running. The transmission mechanism 14 configured as described above allows the planetary gear device 26 to function as a transmission and makes up a power transmission device capable of motor running.

Figure 2:
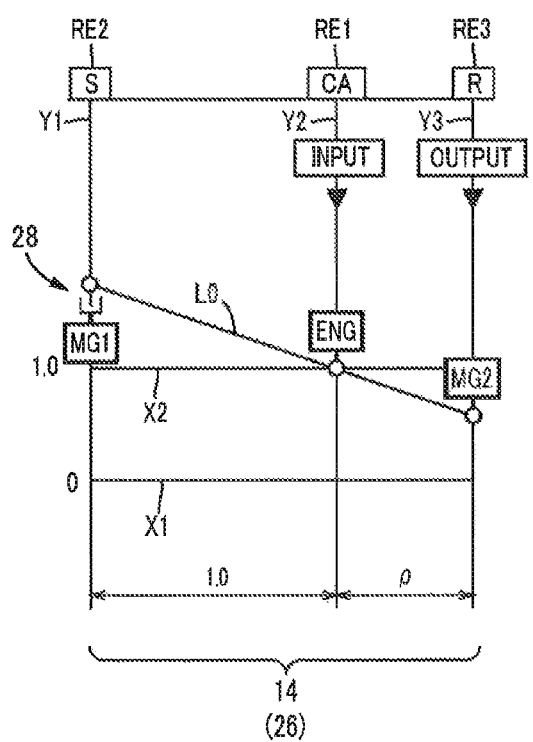
FIG. 2 is a collinear diagram capable of representing the relative relationships of the rotation speeds of the rotating elements in the transmission mechanism of FIG. 1 on straight lines.

FIG. 2 is a collinear diagram capable of representing the relative relationships of the rotation speeds of the rotating elements in the transmission mechanism 14 on straight lines. The collinear diagram of FIG. 2 represents two-dimensional coordinates defined by a horizontal axis indicative of a relationship of the gear ratio ρ of the planetary gear device 26 and a vertical axis indicative of a relative rotation speed; a horizontal line X1 indicates a zero rotation speed; and a horizontal line X2 indicates a rotation speed "1.0", i.e., a rotation speed $N_E$ of the engine 18 operably coupled to the input shaft 24.

Three vertical lines Y1, Y2, and Y3 corresponding to the three rotating elements of the planetary gear device 26 making up the transmission mechanism 14 indicate relative rotation speeds of the sun gear S corresponding to a second rotating element RE2, the carrier CA corresponding to a first rotating element RE1, and the ring gear R corresponding to the third rotating element RE3 in the order from left to right, and the intervals thereof are determined depending on the gear ratio ρ of the planetary gear device 26. In particular, in the relationship between the vertical axes of the collinear diagram, when an interval corresponding to "1" is defined between a sun gear and a carrier, an interval corresponding to the gear ratio ρ of a planetary gear device is defined between the carrier and a ring gear. Therefore, in the case of the transmission mechanism 14, the interval corresponding to "1" is set between the vertical lines Y1 and Y2, and the interval between the vertical lines Y2 and Y3 is set to the interval corresponding to the gear ratio ρ.

When the transmission mechanism 14 of this embodiment is represented by using the collinear diagram of FIG. 2, the first rotating element RE1 (the carrier CA) of the planetary gear device 26 is coupled to the input shaft 24, i.e., the engine 18 in a power transmittable manner; the second rotating element RE2 (the sun gear 5) is coupled via the torque limiter device 28 to the first electric motor MG1 in a power transmittable manner; and the third rotating element RE3 (the ring gear R) is coupled to the output gear 30 and the second electric motor MG2 and coupled to the drive wheels 40 in a power transmittable manner such that the rotation of the input shaft 24 is transmitted via the output gear 30 to the drive wheels 40. A diagonal straight line L0 passing through the intersection point of Y2 and X2 indicates the relationship between the rotation speed of the sun gear S and the rotation speed of the ring gear R. For example, the transmission mechanism 14 (the planetary gear device 26) allows the first rotating element RE1 to the third rotating element RE3 to rotate relative to each other to achieve the differential state and, if the rotation speed of the ring gear R indicated by the intersecting point between the line L0 and the vertical line Y3 is restricted and kept substantially constant by the vehicle speed V, when a rotation speed $N_{M1}$ of the first electric motor MG1 is controlled to increase or decrease the rotation speed of the sun gear S indicated by the intersecting point between the line L0 and the vertical line Y1, the rotation speed of the carrier CA indicated by the intersecting point between the line L0 and the vertical line Y2, i.e., the engine rotation speed $N_E$, is increased or decreased.

Figure 3:
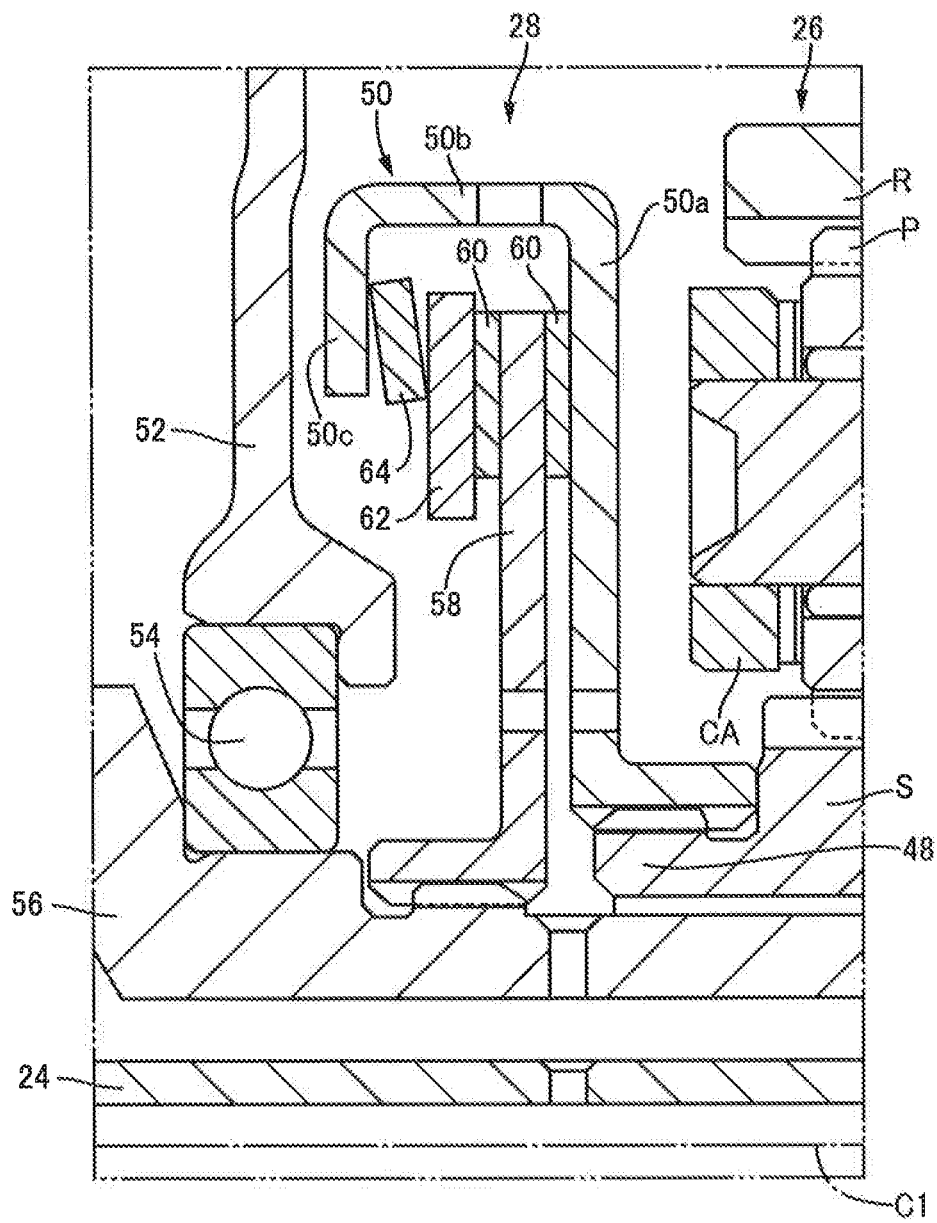
FIG. 3 is a cross-sectional view of a main portion of the torque limiter device of FIG. 1.

FIG. 3 is a cross-sectional view of a main portion of the torque limiter device 28. In FIG. 3, the torque limiter device 28 includes a cover member 50 having, for example, an annular plate-shaped wall portion 50a having an inner circumferential portion spline-fitted to an outer circumferential surface of one end portion 48 of the sun gear S non-rotatably around the shaft center C1 of the input shaft 24, a cylindrical portion 50b projected from an outer circumferential portion of the wall portion 50a toward a partition wall 52; and an annular plate-shaped outer circumferential wall portion 50c projected circumferentially continuously and radially inward from one end portion of the cylindrical portion 50b closer to the partition wall 52. The torque limiter device 28 is an annular plate-shaped member having an inner circumferential portion spline-fitted to an outer circumferential surface of an output shaft 56 of the first electric motor MG1 non-rotatably around the shaft center C1 between a ball bearing 54 and the sun gear S in the shaft center C1 direction, for example, and the torque limiter device 28 has a plate member 58 having an outer circumferential portion disposed between the wall portion 50a and the outer circumferential wall portion 50c of the cover member 50 in the shaft center C1 direction, a pair of friction materials 60 fixed to the outer circumferential portion on the both side surfaces of the plate member 58, and a disk spring 64 disposed on the side opposite to the wall portion 50a of the cover member 50 relative to the plate member 58 such that the plate member 58 is biased via an annular plate-shaped pressing member 62 toward the wall portion 50a of the cover member 50. In this embodiment, one of the cover member 50 and the plate member 58 corresponds to a first rotating member and the other corresponds to a second rotating member.

The torque limiter device 28 configured as described above is disposed between the first electric motor MG1 and the second rotating element RE2 (the sun gear S) such that the sun gear S of the planetary gear device 26 is coupled to the cover member 50 in a power transmittable manner while the first electric motor MG1 is coupled to the plate member 58 in a power transmittable manner. While the torque limiter device 28 transmits torque between the sun gear S of the planetary gear device 26 and the output shaft 56 of the first electric motor MG1 through the friction via the friction materials 60 between the cover member 50 and the plate member 58, if a torque difference between the cover member 50 and the plate member 58 exceeds a torque difference defined in advance, the cover member 50 and the plate member 58 slip on each other to suppress the torque transmission between the sun gear S of the planetary gear device 26 and the output shaft 56 of the first electric motor MG1. Therefore, the torque limiter device 28 blocks the transmission of a torque amount exceeding a predetermined torque defined in advance with the operation involving differential rotation (i.e., by allowing the differential rotation) between the cover member 50 and the plate member 58.

Figure 4:
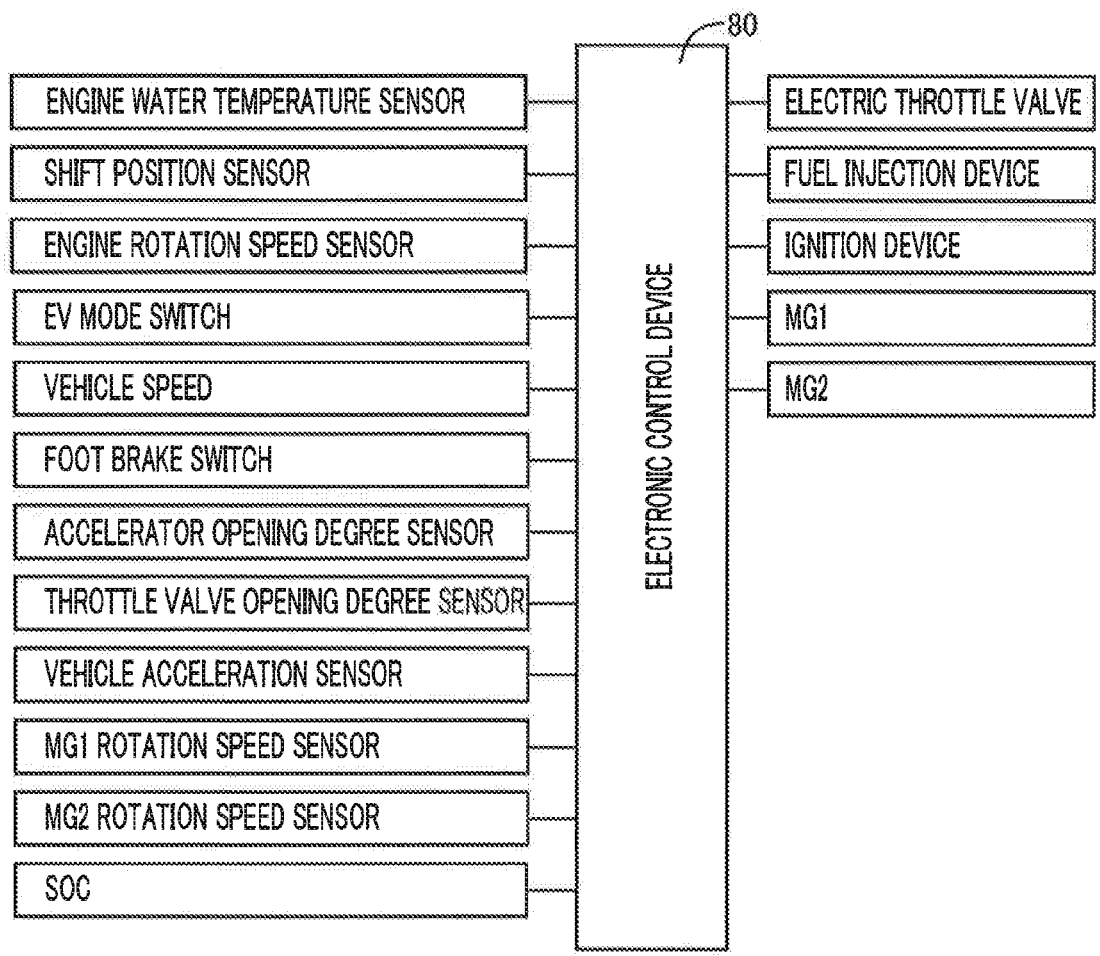
FIG. 4 is a diagram for explaining signals input to and signals output from the electronic control device disposed on the vehicle.

FIG. 4 exemplarily illustrates signals input to an electronic control device 80 including a control device of the power transmission device 12 and signals output from the electronic control device 80. The electronic control device 80 includes a so-called microcomputer made up of a CPU, a ROM, a RAM, and an I/O interface, for example, and executes signal processes in accordance with programs stored in advance in the ROM, while utilizing a temporary storage function of the RAM, to provide vehicle control such as hybrid drive control related to the engine 18, the first electric motor MG1, the second electric motor MG2, etc.

The electronic control device 80 is supplied, from sensors, switches, etc., as depicted in FIG. 4, with a signal indicative of an engine water temperature $TH_W$, a signal indicative of a shift position $P_{SH}$ of a shift lever, a signal indicative of the engine rotation speed $N_E$ that is the rotation speed of the engine 18, a signal indicative of the presence of a switch operation for setting a motor running (EV running) mode, a signal indicative of a vehicle speed V corresponding to an output rotation speed $N_{OUT}$ that is the rotation speed of the output gear 30, a signal indicative of a foot brake operation, a signal indicative of an accelerator opening degree Acc that is an amount of an accelerator pedal operation corresponding to an acceleration request of a driver (user) to the vehicle 10, a signal indicative of a throttle valve opening degree $\theta_{TH}$ of an electronic throttle valve, a signal indicative of longitudinal acceleration G of the vehicle, a signal indicative of an MG1 rotation speed $N_{M1}$ that is the rotation speed $N_{M1}$ of the first electric motor MG1, a signal indicative of an MG2 rotation speed $N_{M2}$ that is the rotation speed $N_{M2}$ of the second electric motor MG2, a signal indicative of a charging state (charging capacity) SOC of an electric storage device 68 calculated based on an electric storage device temperature $TH_{BAT}$, an charging/discharging current $I_{CD}$, and a voltage $V_{BAT}$ of the electric storage device 68 (see FIG. 5), etc.

The electronic control device 80 outputs control signals to an engine output control device 70 (see FIG. 5) controlling engine output, for example, a drive signal to a throttle actuator operating the throttle valve opening degree $\theta_{TH}$ of the electronic throttle valve, a fuel supply amount signal controlling a fuel supply amount from a fuel injection device, an ignition signal giving a command for the timing of ignition of the engine 18 by an ignition device, command signals to an inverter 66 (see FIG. 5) controlling the operations of the first electric motor MG1 and the second electric motor MG2, etc.

The electric storage device 68 depicted in FIG. 5 described later is a chargeable/dischargeable direct-current power source and consists of a secondary battery such as nickel-hydride and lithium-ion, for example. Specifically, during vehicle acceleration running, electric energy (electric power) is generated by the first electric motor MG1 when taking a reaction force to the output of the engine 18 and is accumulated through the inverter 66 into the electric storage device 68. At the time of regenerative braking during vehicle deceleration running, electric power generated by the second electric motor MG2 is accumulated through the inverter 66 into the electric storage device 68. During motor running using the second electric motor MG2, the electric power accumulated in the electric storage device 68 is supplied through the inverter 66 to the second electric motor MG2.

Figure 5:
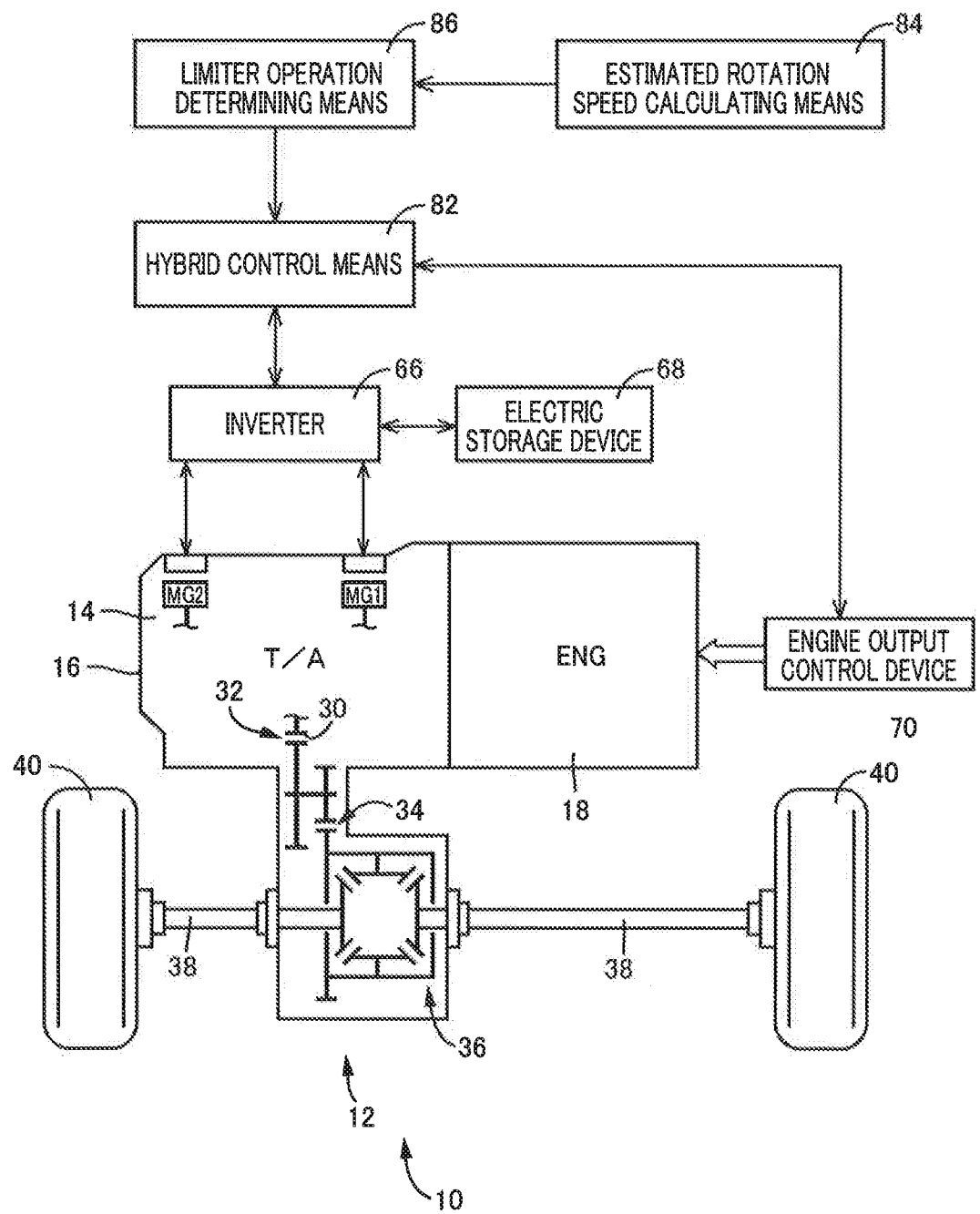
FIG. 5 is a functional block diagram for explaining a main portion of the control function of the electronic control device.

FIG. 5 is a functional block diagram for explaining a main portion of the control function of the electronic control device 80. In FIG. 5, a hybrid control portion, i.e., a hybrid control means 82 has, for example, a function as an engine drive control means controlling the drive of the engine 18 through the engine output control device 70 and a function as an electric motor operation control means controlling the operations of the first electric motor MG1 and the second electric motor MG2 as a drive force source or an electric generator through the inverter 66, and provides control of the hybrid drive by the engine 18, the first electric motor MG1, and the second electric motor MG2 through these control functions.

Specifically, while operating the engine 18 in an efficient operation range, the hybrid control means 82 changes the drive force distribution between the engine 18 and the second electric motor MG2 and the reaction force due to the electric generation by the first electric motor MG1 to the optimum state to control the gear ratio δ0 of the transmission mechanism 14 acting as an electric stepless transmission. For example, for a running vehicle speed V at a time point, a target (request) output (user request power) of the vehicle 10 is calculated from the accelerator opening degree $A_{CC}$ considered as an output power request amount of a driver and the vehicle speed V; a necessary total target output is calculated from the target output and a charge request amount (charge request power); and a target engine output (request engine output, engine request power) $P_E^*$ is calculated such that the total target output is acquired in consideration of a transmission loss, an accessory load, an assist torque of the second electric motor MG2, etc., to control the engine 18 and control the output and the electric generation of the first electric motor MG1 and the second electric motor MG2 so as to achieve the engine rotation speed $N_E$ and the output torque (engine torque) $T_E$ of the engine 18 for acquiring the target engine output $P_E^*$.

In other words, the hybrid control means 82 provides the control of the engine 18, the first electric motor MG1, and the second electric motor MG2 for the purpose of improvements in power performance, fuel consumption and the like. In such hybrid control, the transmission mechanism 14 is driven to function as an electric stepless transmission to match the engine rotation speed $N_E$ determined for operating the engine 18 in an efficient operation range with the output rotation speed $N_{OUT}$ determined by the vehicle speed V etc. Therefore, the hybrid control means 82 preliminarily stores an optimal fuel consumption rate curve $L_E$ (fuel consumption map, optimal fuel consumption line) that is a kind of well-known operation curve of the engine 18 as represented by, for example, a broken line of FIG. 6 empirically obtained in advance so as to satisfy both the drivability (power performance) and the fuel consumption property (fuel consumption performance) during running with stepless transmission in the two-dimensional coordinates made up of the engine rotation speed $N_E$ and the engine torque $T_E$, for example. The hybrid control means 82 determines target values of the engine torque $T_E$ and the engine rotation speed $N_E$ for generating the target engine output $P_E^*$ necessary for satisfying, for example, the total target output such that the engine 18 is operated while an engine operation point $P_{EG}$, i.e., an operation point of the engine 18, is moved along the optimal fuel consumption rate curve $L_E$, and the hybrid control means 82 provides the output control of the engine 18 while controlling the gear ratio γ0 of the transmission mechanism 14 in a stepless manner within the available variation range so as to acquire the target values. The engine operation point $P_{EG}$ is an operation point indicative of the operation state of the engine 18 in the two-dimensional coordinates with a coordinate axis of a state amount indicative of the operation state of the engine 18 exemplarily illustrated by the engine rotation speed $N_E$ and the engine torque $T_E$. In this embodiment, for example, fuel consumption is a running distance per unit fuel consumption, a fuel consumption rate (=fuel consumption/drive wheel output) of a vehicle as a whole, etc.

In this case, since the hybrid control means 82 supplies, for example, the electric energy generated by the first electric motor MG1 through the inverter 66 to the electric storage device 68 and the second electric motor MG2, a main portion of the power of the engine 18 is mechanically transmitted to the output gear 30 while a portion of the power of the engine 18 is consumed for the electric generation of the first electric motor MG1 and converted into electric energy; the electric energy is supplied through the inverter 66 to the second electric motor MG2; the second electric motor MG2 is driven by the electric energy; and a drive force output from the second electric motor MG2 is transmitted to the output gear 30. The equipment related to the electric energy from the generation by the first electric motor MG1 responsible for the electric generation to the consumption by the second electric motor MG2 responsible for the driving makes up an electric path from the conversion of a portion of the power of the engine 18 into electric energy to the conversion of the electric energy into mechanical energy.

The hybrid control means 82 can provide so-called torque assist for complementing the power of the engine 18 by supplying the electric energy from the first electric motor MG1 and/or the electric energy from the electric storage device 68 through the electric path described above to the second electric motor MG2 to drive the second electric motor MG2 and apply a torque to the drive wheels 40 during the engine running using the engine 18 as the drive force source.

The hybrid control means 82 can perform the motor running (EV running) using only the second electric motor MG2 as the drive force source by driving the second electric motor MG2 with the electric power from the electric storage device 68 while the operation of the engine 18 is stopped. For example, the EV running by the hybrid control means 82 is performed in a relatively lower output torque $T_{OUT}$ range, i.e., a lower engine torque $T_E$ range generally considered as having poor engine efficiency as compared to a higher torque range, or in a relatively lower vehicle speed range of the vehicle speed V, i.e., a lower load range. During the EV running, the hybrid control means 82 achieves a no-load state to idle the first electric motor MG1, for example, and maintains the engine rotation speed $N_E$ at zero or substantially zero as needed through the differential action of the transmission mechanism 14 so as to suppress the drag of the non-operating engine 18 and improve the fuel consumption. Therefore, the hybrid control means 82 not only simply stops the operation of the engine 18 but also stops the rotation (rotational drive) of the engine 18 during the EV running.

The hybrid control means 82 functionally includes an engine start control means starting (activating) the engine 18 during vehicle stop or during the EV running. For example, the hybrid control means 82 applies a current to the first electric motor MG1 during vehicle stop or during the EV running to raise the MG1 rotation speed $N_{M1}$ and generate a predetermined engine starting torque, i.e., a cranking torque $T_{M1}$cr, for rotationally driving the engine rotation speed $N_E$ equal to or greater than a predetermined rotation speed $N_E'$ enabling the complete explosion, and the hybrid control means 82 supplies (injects) fuel with a fuel injection device and ignites the fuel with an ignition device at the predetermined rotation speed $N_E'$ or higher, for example, the engine rotation speed $N_E$ enabling autonomous rotation equal to or greater than an idle rotation speed, to start the engine 18. In this way, the first electric motor MG1 is allowed to function as a starting motor (starter) for rotationally driving the engine 18 at the start of the engine.

Figure 8A:
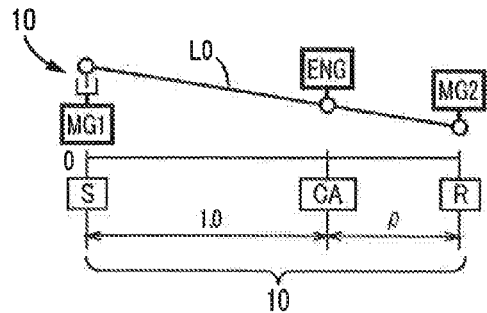
FIG. 8 is a diagram of an example depicted on a collinear diagram in the case of sudden braking of the vehicle.
Figure 8B:
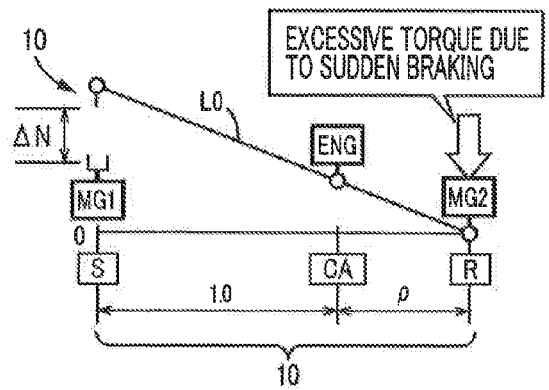

The transmission mechanism 14 of this embodiment is disposed with the torque limiter device 28 and if the torque limiter device 28 is operated due to input of excessive torque, the members of the power transmission device 12 are prevented from retaining excessive torsion, for example, and the durability of components is improved. FIG. 7 is a diagram of an example depicted on a collinear diagram in the case of input of an excessive engine explosion torque, for example, and FIG. 8 is a diagram of an example depicted on a collinear diagram in the case of sudden braking of the vehicle 10, for example. In FIGS. 7 and 8, FIGS. 7(a) and 8(a) are diagrams of a non-operating state when the torque limiter device 28 is not in operation and FIGS. 7(b) and 8(b) are diagrams of an operating state when the torque limiter device 28 is in operation. Therefore, if the excessive torque is input, the torque limiter device 28 is operated and a shift is made from FIGS. 7(a) and 8(a) to FIGS. 7(b) and 8(b) to prevent the members of the power transmission device 12 from retaining excessive torsion, for example.

On the other hand, during operation of the torque limiter device 28, a rotation speed difference $\Delta N$ is generated between the cover member 50 and the plate member 58 and friction heat is generated between the cover member 50 and the friction materials 60 and between the pressing member 62 and the friction materials 60, for example. Therefore, the strength design of the friction materials 60 must be performed to achieve a heat capacity resistant to a generated heat quantity of the friction heat generated during operation of the torque limiter device 28. From another point of view, if the generated heat quantity can be reduced, the design heat capacity of the torque limiter device 28 can be made smaller and, for example, the cost of the torque limiter device 28 can be reduced. However, the generated heat quantity is dependent on magnitude of the rotation speed difference $\Delta N$ during operation of the torque limiter device 28 and an operating time of the torque limiter device 28, for example, and the magnitude of the rotation speed difference $\Delta N$ and the operating time are dependent on magnitude and duration time of input excessive torque. Since the excessive torque is dependent on, for example, a vehicle running state (a way of running) of the vehicle 10, such as how the brake pedal is pressed, and environmental characteristics, such as output variations due to the engine water temperature $TH_W$, it is difficult to reduce the generated heat quantity.

Therefore, in this embodiment, to suppress the magnitude of the rotation speed difference $\Delta N$ and the operating time of the torque limiter device 28, for example, when the rotation speed difference $\Delta N$ is generated between the cover member 50 and the plate member 58 due to operation of the torque limiter device 28, the first electric motor MG1 is operated such that the rotation speed difference $\Delta N$ is suppressed. The rotation speed difference $\Delta N$ is a rotation speed difference between the rotation speed of the cover member 50 and the rotation speed of the plate member 58 and is, for example, a rotation speed difference $\Delta N$ ($=N_S - N_{M1}$) between the rotation speed of the sun gear S of the planetary gear device 26 (sun gear rotation speed $N_S$) acting as the rotation speed of the cover member 50 and the MG1 rotation speed $N_{M1}$ acting as the rotation speed of the plate member 58.

More specifically, returning to FIG. 5, an estimated rotation speed calculating portion, i.e., an estimated rotation speed calculating means 84, calculates an estimated value (estimated sun gear rotation speed) $N_S$es of the sun gear rotation speed $N_S$ based on the actual engine rotation speed $N_E$ and the MG2 rotation speed $N_{M2}$ from a correlation equation of the rotation speeds of the first rotation element RE1 to the third rotation element RE3 in the planetary gear device 26 as expressed by Equation (1), for example. Equation (1) uses the engine rotation speed $N_E$ as the rotation speed of the first rotation element RE1 (carrier CA) and the MG2 rotation speed $N_{M2}$ as the rotation speed of the third rotation element RE3 (ring gear R) to calculate the estimated value $N_S$es of the sun gear rotation speed $N_S$, which is the rotation speed of the second rotation element RE2 (sun gear S). When the torque limiter device 28 is not in operation, the MG1 rotation speed $N_{M1}$ can be used as the sun gear rotation speed $N_S$; however, when the torque limiter device 28 is in operation, the rotation speed difference ΔN is generated between the sun gear rotation speed $N_S$ and the MG1 rotation speed $N_{M1}$ and, therefore, the estimated sun gear rotation speed $N_S$es is calculated from Equation (1). From another point of view, the estimated sun gear rotation speed $N_S$es is an estimated value (estimated MG1 rotation speed) $N_{M1}$es of the MG1 rotation speed $N_{M1}$ when it is considered that the torque limiter device 28 is not in operation. Therefore, the operation of the torque limiter device 28 can be determined from the consistency between the calculated estimated sun gear rotation speed $N_S$es (estimated MG1 rotation speed $N_{M1}$es) and the MG1 rotation speed $N_{M1}$ actually detected by a sensor (actual MG1 rotation speed $N_{M1}$).

$$N_Ses=((1+\rho)N_E-N_{M2})/\rho \quad (1)$$

A limiter operation determining portion, i.e., a limiter operation determining means 86, determines the operation of the torque limiter device 28, for example, based on an estimated rotation speed difference ΔNes (=$N_S$es−$N_{M1}$) between the actual MG1 rotation speed $N_{M1}$ and the estimated sun gear rotation speed $N_S$es calculated by the estimated rotation speed calculating means 84, i.e., based on the estimated rotation speed difference ΔNes (=$N_{M1}$es−$N_{M1}$) between the actual MG1 rotation speed $N_{M1}$ and the estimated MG1 rotation speed $N_{M1}$es. Specifically, if the estimated rotation speed difference ΔNes exceeds a predetermined rotation speed difference ΔN' obtained and set empirically or in design in advance for determining that the torque limiter device 28 is in operation, the limiter operation determining means 86 determines that the torque limiter device 28 is in operation. On the other hand, if the estimated rotation speed difference ΔNes is equal to or less than the predetermined rotation speed difference ΔN', the limiter operation determining means 86 determines that the torque limiter device 28 is not in operation.

For example, if the limiter operation determining means 86 determines that the torque limiter device 28 is in operation, the hybrid control means 82 operates the first electric motor MG1 such that the actual MG1 rotation speed $N_{M1}$ is turned to the estimated sun gear rotation speed $N_S$es (estimated MG1 rotation speed $N_{M1}$es) calculated by the estimated rotation speed calculating means 84, i.e., the estimated rotation speed difference ΔNes is suppressed toward zero (e.g., the estimated rotation speed difference ΔNes is turned to zero). Therefore, the hybrid control means 82 sets the estimated MG1 rotation speed $N_{M1}$es when it is considered that the torque limiter device 28 is not in operation, as a command value (MG1 rotation speed command value) of a rotation speed command of the first electric motor MG1 so as to suppress the rotation speed difference ΔN during operation of the torque limiter device 28 and the operating time of the torque limiter device 28. The operation of the first electric motor MG1 in this case is rotation speed control using the estimated MG1 rotation speed $N_{M1}$es as a target value, for example, and is performed by suppressing an amount of electric generation (regeneration) in reaction force control (regeneration control) that has been provided to generate a reaction force to the engine torque $T_E$ or by providing power running control for rotationally driving the first electric motor MG1 instead of the reaction force control. The control form may be switched depending on magnitude of the estimated rotation speed difference ΔNes and, for example, the amount of electric generation (regeneration) may be suppressed when the estimated rotation speed difference ΔNes is relatively small while the power running control may be provided to the first electric motor MG1 when the estimated rotation speed difference ΔNes is relatively large. If it is desired to more promptly turn the actual MG1 rotation speed $N_{M1}$ to the estimated MG1 rotation speed $N_{M1}$es, the power running control may be provided to the first electric motor MG1.

On the other hand, for example, if the limiter operation determining means 86 determines that the torque limiter device 28 is not in operation, the hybrid control means 82 provides the normal control that is the control of the engine 18, the first electric motor MG1, and the second electric motor MG2 described above such that the engine 18 is operated while the engine operation point $P_{EG}$ is moved along the optimal fuel consumption rate curve $L_E$ as indicated by the broken line of FIG. 6, for example.

In the configuration of the transmission mechanism 14 of this embodiment, when the first electric motor MG1 is operated to suppress the rotation speed difference ΔN during operation of the torque limiter device 28, the electric generation by the first electric motor MG1 is suppressed or the first electric motor MG1 cannot generate electricity because of the power running of the first electric motor MG1. Therefore, for example, if the second electric motor MG2 is driven to apply torque to the drive wheels 40 in this state, more electric power is used from the electric storage device 68 or only the electric power from the electric storage device 68 is used. Therefore, in this embodiment, to suppress the power consumption of the electric storage device 68, when the torque limiter device 28 is in operation, i.e., when the first electric motor MG1 is operated to suppress the estimated rotation speed difference ΔNes, the output of the second electric motor MG2 (e.g., MG2 torque $T_{M2}$) is suppressed. In other words, for example, when the torque limiter device 28 is in operation due to the state of occurrence of excessive torque, the output of the second electric motor MG2 is suppressed to restrain the power consumption of the electric storage device 68 while the vehicle 10 cannot be driven by a torque amount exceeding the excessive torque (e.g., while originally desired drive torque cannot be acquired).

Specifically, for example, when the first electric motor MG1 is operated to suppress the estimated rotation speed difference ΔNes, the hybrid control means 82 outputs a drive command value for the second electric motor MG2 so as to suppress the MG2 torque $T_{M2}$, for example, the assist torque of the second electric motor MG2.

Figure 9:
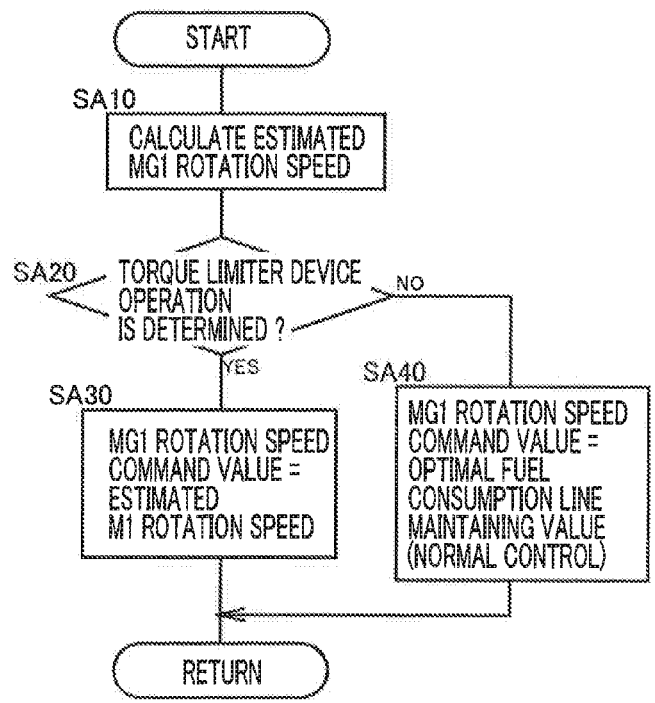
FIG. 9 is a flowchart for explaining a main portion of the control operation of the electronic control device, i.e., the control operation for reducing the design heat capacity of the torque limiter device.

FIG. 9 is a flowchart for explaining a main portion of the control operation of the electronic control device 80, i.e., the control operation for reducing the design heat capacity of the torque limiter device 28, and is repeatedly executed with an extremely short cycle time, for example, on the order of few msec to a few tens of msec.

In FIG. 9, first, at step (hereinafter, step will be omitted) SA10 corresponding to the estimated rotation speed calculating means 84, for example, from the correlation equation of the rotation speeds of the first rotating element RE1 to the third rotating element RE3 in the planetary gear device 26 as expressed by Equation (1), the estimated sun gear rotation speed $N_S$es (estimated MG1 rotation speed $M_{M1}$es) is sequentially calculated based on the actual engine rotation speed $N_E$ and the MG2 rotation speed $N_{M2}$. At SA20 corresponding to the limiter operation determining means 86, it is determined whether the torque limiter device 28 is in operation, based on whether the predetermined rotation speed difference ΔN' is exceeded by the estimated rotation speed difference ΔNes (=$N_{M1}$es−$N_{M1}$) between the actual MG1 rotation speed $N_{M1}$ and the estimated MG1 rotation speed $N_{M1}$es calculated at SA10, for example. If the determination at SA 20 is affirmative, at SA30 corresponding to the hybrid control means 82, the estimated MG1 rotation speed $N_{M1}$es calculated at SA10 is set as the MG1 rotation speed command value such that the estimated rotation speed difference ΔNes is suppressed toward zero, for example. At SA30, a drive command value for the second electric motor MG2 may be output such that the MG2 torque $T_{M2}$ is suppressed at the same time. On the other hand, if the determination of SA20 is negative, the normal control of the engine 18, the first electric motor MG1, and the second electric motor MG2 is provided at SA40 also corresponding to the hybrid control means 82 such that the engine 18 is operated while the engine operation point $P_{EG}$ is moved along the optimal fuel consumption rate curve $L_E$ as indicated by the broken line of FIG. 6, for example.

As described above, according to this embodiment, when the rotation speed difference ΔN is generated between the cover member 50 and the plate member 58 due to operation of the torque limiter device 28, the first electric motor MG1 is operated to suppress the rotation speed difference ΔN and, therefore, for example, the rotation speed difference ΔN in the operation state of the torque limiter device 28 can be reduced or the operating time of the torque limiter device 28 can be shortened, thereby suppressing the generated heat quantity of the friction heat generated during operation of the torque limiter device 28. Therefore, the design heat capacity of the torque limiter device 28 can be made smaller. As a result, the strength design of the friction materials 60 of the torque limiter device 28 can be simplified and the cost of the torque limiter device 28 can be reduced.

According to this embodiment, since the planetary gear device 26 is included that has three rotating elements, which are the first rotating element RE1 coupled to the engine 18 in a power transmittable manner, the second rotating element RE2 coupled to the first electric motor MG1 in a power transmittable manner, and the third rotating element RE3 coupled to the drive wheels 40 (the output gear 30) in a power transmittable manner, the first electric motor MG1 can be operated to suppress the rotation speed difference ΔN during operation of the torque limiter device 28 without effect of the inertia of the engine 18 and the generated heat quantity of the friction heat generated during operation of the torque limiter device 28 is appropriately suppressed in the power transmission device 12 including the planetary gear device 26 distributing the power of the engine 18 to the first electric motor MG1 side and the drive wheel 40 (the output gear 30) side, for example.

According to this embodiment, since the torque limiter device 28 is disposed between the first electric motor MG1 and the second rotating element RE2 of the planetary gear device 26, i.e., the first electric motor MG1 is coupled via the torque limiter device 28 to the second rotating element RE2, the engine torque $T_E$ input to the torque limiter device 28 is reduced to ρ/(1+ρ) due to the effect of the planetary gear device 26 as compared to the case of disposing the torque limiter device 28 between the engine 18 and the first rotating element RE1 of the planetary gear device 26, for example. Therefore, the cost of the friction materials 60 of the torque limiter device 28 dependent on a transmission torque capacity can be reduced. For example, as compared to the case of coupling the first electric motor MG1 via the planetary gear device 26 to one of the cover member 50 and the plate member 58 of the torque limiter device 28 in a power transmittable manner, the first electric motor MG1 is more easily operated to suppress the rotation speed difference ΔN during operation of the torque limiter device 28.

According to this embodiment, the operation of the torque limiter device 28 is determined based on the estimated rotation speed difference ΔNes (=$N_{M1}$es−$N_{M1}$) between the actual MG1 rotation speed $N_{M1}$ and the estimated sun gear rotation speed $N_S$es (estimated MG1 rotation speed $N_{M1}$es) calculated from a correlation equation of the rotation speeds of the first rotation element RE1 to the third rotation element RE3 in the planetary gear device 26 as expressed by Equation (1) described above; if the operation of the torque limiter device 28 is determined, the first electric motor MG1 is operated to vary the actual MG1 rotation speed $N_{M1}$ to the calculated estimated MG1 rotation speed $N_{M1}$es; therefore, for example, whether the torque limiter device 28 is operated is easily determined; and the first electric motor MG1 can more appropriately be operated to suppress the rotation speed difference ΔN during operation of the torque limiter device 28 toward zero (e.g., to turn the rotation speed difference ΔN to zero).

According to this embodiment, when the first electric motor MG1 is operated to suppress the rotation speed difference ΔN, the output of the second electric motor MG2 is suppressed and, therefore, for example, in the power transmission device 12 including the planetary gear device 26 distributing the power of the engine 18 to the first electric motor MG1 side and the drive wheel 40 side and the second electric motor MG2 capable of being driven by using the generated electric power of the first electric motor MG1 generated from the power of the engine 18, the first electric motor MG1 can be operated to suppress the rotation speed difference ΔN during operation of the torque limiter device 28 without effect of the inertia of the engine 18 and the generated heat quantity of the friction heat generated during operation of the torque limiter device 28 is appropriately suppressed. While the first electric motor MG1 is operated to suppress the rotation speed difference ΔN during operation of the torque limiter device 28, for example, the electric generation by the first electric motor MG1 is suppressed or the first electric motor MG1 cannot generate electricity because of the power running of the first electric motor MG1 and, for example, if the second electric motor MG2 is driven in this state, more electric power is used from the electric storage device 68 or only the electric power from the electric storage device 68 is used and, in this regard, since the output from the second electric motor MG2 is suppressed, the power consumption of the electric storage device 68 can be suppressed. When the differential action of the planetary gear device 26 is used for mechanically transmitting a main portion of the power from the engine 18 to the drive wheels 40 and for electrically transmitting the remaining portion of the power from the engine 18 by using the electric path from the first electric motor MG1 to the second electric motor MG2 and the electric storage device 68, the planetary gear device 26 (the transmission mechanism 14) can be allowed to function as an electric stepless transmission with a gear ratio changed electrically.

According to this embodiment, since the differential mechanism is the planetary gear device 26 having three rotating elements, which are the sun gear S, the carrier CA, and the ring gear R, and the three rotating elements are the first rotating element RE1 to the third rotating element RE3, the differential mechanism is reduced in dimension in the shaft center direction, for example. The differential mechanism is simply made up of the planetary gear device 26.

According to this embodiment, the planetary gear device 26 has the differential state controlled by controlling the operation state of the first electric motor MG1 and, therefore, for example, in the power transmission device 12 allowing the planetary gear device 26 to function as an electric stepless transmission, the generated heat quantity of the friction heat generated during operation of the torque limiter device 28 is appropriately suppressed.

Another embodiment of the present invention will be described. In the following description, the portions common to each of the embodiments are denoted by the same reference numerals and will not be described.

Second Embodiment

Figure 10A:
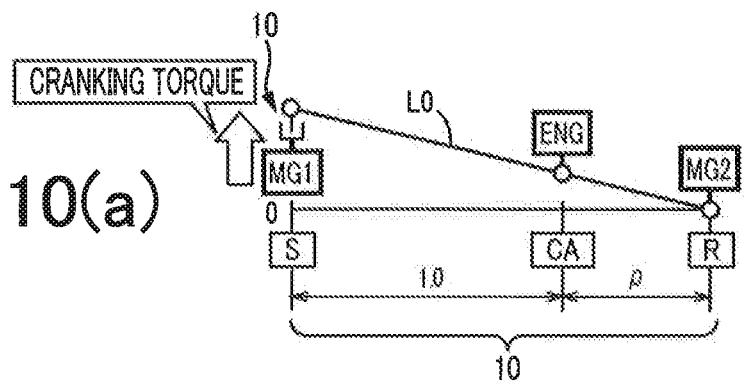
FIG. 10 is a diagram of an example depicted on a collinear diagram in the case of input of excessive engine explosion torque at the start of the engine.
Figure 10B:
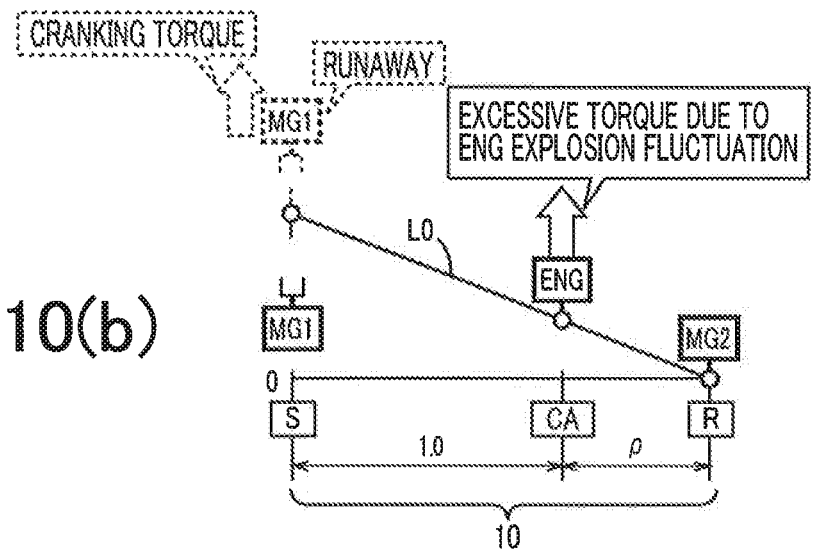

As described above, if the engine 18 is started (activated) in the vehicle 10 of this embodiment during vehicle stop or during the EV running, the MG1 rotation speed $N_{M1}$ is raised, by the hybrid control means 82, to generate the cranking torque $T_{M1}cr$ in the first electric motor MG1 for rotationally driving the engine rotation speed $N_E$ equal to or greater than the predetermined rotation speed $N_E'$ enabling the complete explosion and fuel is ignited at the predetermined rotation speed $N_E'$ or higher to start the engine 18. For example, if excessive engine explosion torque is generated at the start of the engine as described above, the input of the excessive torque causes the torque limiter device 28 to operate. FIG. 10 is a diagram of an example depicted on a collinear diagram in the case of input of excessive engine explosion torque at the start of the engine, for example. In FIG. 10, FIG. 10(a) is a diagram of a non-operating state when the torque limiter device 28 is not in operation and FIG. 10(b) is a diagram of an operating state when the torque limiter device 28 is in operation. Therefore, if excessive torque is input at the start of the engine, the torque limiter device 28 is operated and a shift is made from FIG. 10(a) to FIG. 10(b) to prevent the members of the power transmission device 12 from retaining excessive torsion, for example.

On the other hand, if the torque limiter device 28 is operated in association with engine explosion (ignition) at the start of the engine when the cranking torque $T_{M1}cr$ is generated in the first electric motor or MG1 and the engine 18 is rotationally driven by the first electric motor MG1, the first electric motor MG1 is separated from the engine inertia and, therefore, the first electric motor MG1 may run away as indicated by a broken line of FIG. 10(b). For example, if the first electric motor MG1 runs away, the rotation speed difference $\Delta N$ during operation of the torque limiter device 28 may be increased.

Therefore, in this embodiment, to suppress the runaway of the first electric motor MG1 at the start of the engine, for example, when the torque limiter device 28 is in operation, the output of the first electric motor MG1 for rotationally driving the engine 18 (MG1 torque is reduced toward zero).

Figure 11:
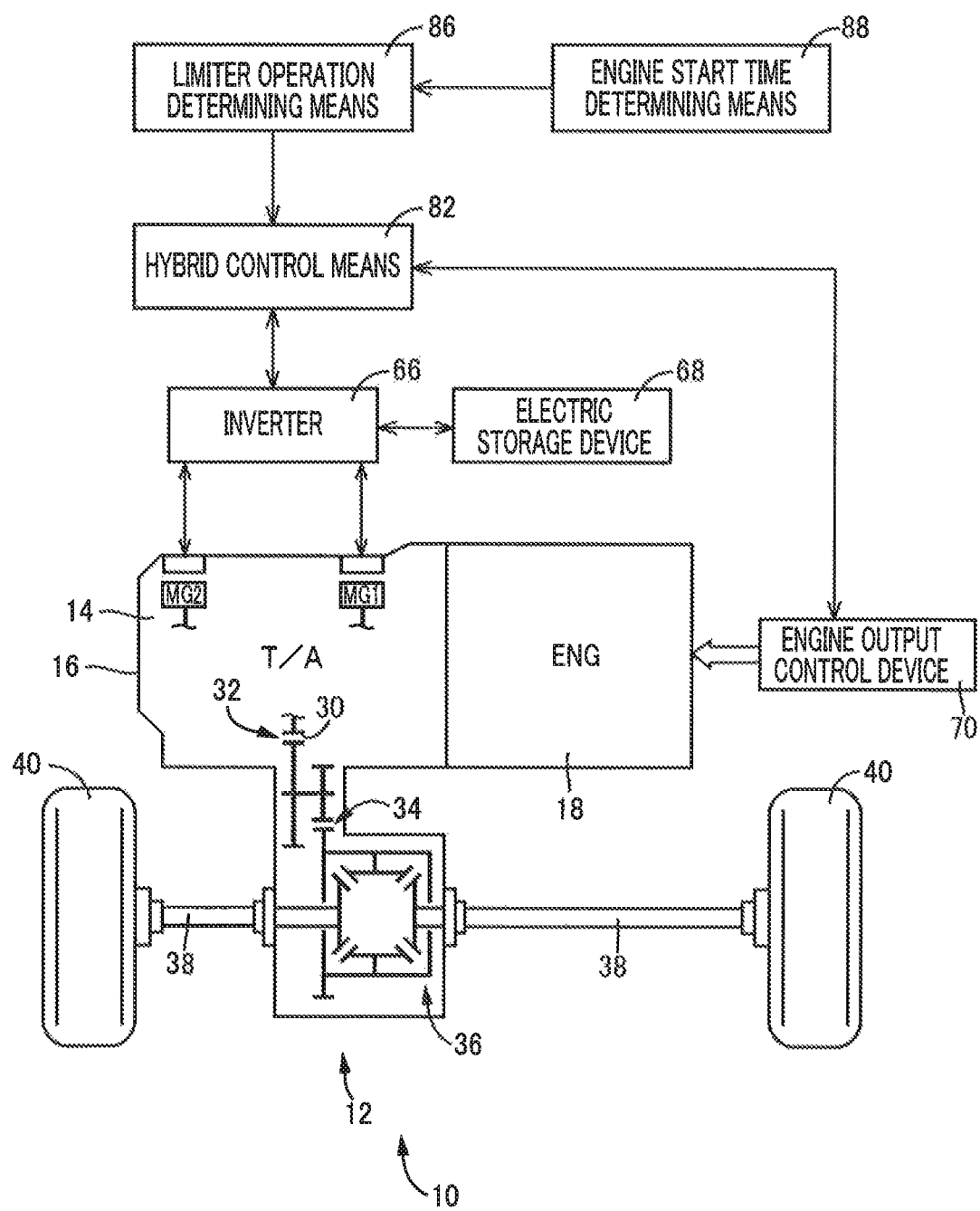
FIG. 11 is a functional block diagram for explaining a main portion of a control function of the electronic control device and depicts another embodiment corresponding to the functional block diagram of FIG. 5.

More specifically, FIG. 11 is a functional block diagram for explaining a main portion of a control function of the electronic control device 80 and depicts another embodiment corresponding to the functional block diagram of FIG. 5. In FIG. 11, an engine start time determining portion, i.e., an engine start time determining means 88, determines whether the current vehicle state is set to an engine start mode that is a predetermined form for starting the engine 18, for example. Specifically, to determine whether the vehicle state is set to the engine start mode, the engine start time determining means 88 determines whether the cranking torque $T_{M1}cr$ is generated in the first electric motor MG1 because the hybrid control means 82 determines that a predetermined engine start condition is satisfied, for example. The hybrid control means 82 determines that the predetermined engine start condition is satisfied, for example, when the request output torque $T_{OUT}$ is increased by the pressing operation of the accelerator pedal and the vehicle state is changed from a motor running range to an engine running range, or when recovery from the well-known fuel-cut operation during deceleration running with an accelerator turned off is determined based on the pressing operation of the accelerator pedal etc., or when it is determined that the actual charging state SOC is less than a prescribed value based on a signal indicative of the charging state SOC of the electric storage device 68 during engine stop in the vehicle stop state, or when it is determined that the engine 18 or a catalytic device must be warmed up based on a signal indicative of the engine water temperature $TH_W$ or a signal indicative of catalyst temperature during engine stop in the vehicle stop state. The prescribed value of the charging state SOC is a value determined in the experiment etc., and stored in advance as a charging state SOC indicating that the engine 18 must be activated to charge the electric storage device 68 through the electric generation of the first electric motor MG1 if the charging state SOC is less than this prescribed value.

For example, when the engine start time determining means 88 determines that the vehicle state is set to the engine start mode, the limiter operation determining means 86 determines the operation of the torque limiter device 28 based on whether a predetermine value (predetermined MG1 rotation speed change rate $dN_{M1}'$) is exceeded by an actual value (actual MG1 rotation speed change rate $dN_{M1}$) of a rotation speed change rate $d(N_{M1})/dt$ (MG1 rotation speed change rate $dN_{M1}$) of the first electric motor MG1 when the engine 18 is rotationally driven by the first electric motor MG1, instead of or in addition to the embodiment described above. For example, the predetermined MG1 rotation speed change rate $dN_{M1}'$ is a limiter operation determination value acquired by adding a predetermined safety margin β in consideration of variations etc., to a predetermined cranking time MG1 rotation speed change rate $dN_{M1}cr$ empirically obtained and set in advance as the MG1 rotation speed change rate $dN_{M1}$ when the cranking torque $T_{M1}cr$ is generated in the first electric motor MG1 at the start of the engine. This limiter operation determination value is also an MG1 runaway determination value for determining whether the first electric motor MG1 is running away. Specifically, if Equation (2) is satisfied, the limiter operation. determining means 86 determines that the torque limiter device 28 is in operation. On the other hand, if Equation (2) is not yet satisfied, the limiter operation determining means 86 determines that the torque limiter device 28 is not in operation. The limiter operation determination value acquired by adding the predetermined safety margin 13 to the predetermined cranking time MG1 rotation speed change rate $dN_{M1}cr$ is a predetermined MG1 rotation speed change rate $dN_{M1}$ based on the cranking torque $T_{M1}cr$, for example, and may be a value calculated from Equation (3) based on the cranking torque $T_{M1}cr$, a predetermined drag torque Tf of the friction materials 60, an axial inertia moment of the first electric motor MG1, and an adjustment value α (>0).

$$dN_{M1} \geq dN_{M1}cr + \beta (\beta > 0) \qquad (2)$$

$$dN_{M1}cr + \beta = (T_{M1}cr - Tf)/I_{M1} - \alpha \qquad (3)$$

For example, if the limiter operation determining means 86 determines that the torque limiter device 28 is in operation, the hybrid control means 82 outputs a drive command value to the first electric motor MG1 such that the MG1 torque $T_{M1}$, for example, the cranking torque $T_{M1}cr$ of the first electric motor MG1 is turned to zero, and reduces the cranking torque $T_{M1}cr$ toward zero so as to suppress the runaway of the first electric motor MG1. On the other hand, for example, if the limiter operation determining means 86 determines that the torque limiter device 28 is not in operation, the hybrid control means 82 continues the normal control at the start of the engine in which the cranking torque $T_{M1}cr$ is generated in the first electric motor MG1, i.e., the MG1 rotation speed command value is set to the predetermined cranking time MG1 rotation speed change rate $dN_{M1}cr$, to rotationally drive the engine 18.

FIG. 12 is a flowchart for explaining a main portion of the control operation of the electronic control device 80, i.e., the control operation for suppressing the runaway of the first electric motor MG1 at the start of the engine, and is repeatedly executed with an extremely short cycle time, for example, on the order of few msec to a few tens of msec.

In FIG. 12, at SB10 corresponding to the engine start time determining means 88, for example, it is determined whether the current vehicle state is set to the engine start mode for starting the engine 18. If the determination at SB10 is negative, this routine is terminated and if the determination is positive, it is determined at SB20 corresponding to the limiter operation determining means 86 whether the torque limiter device 28 is operated based on whether the predetermined MG1 rotation speed change rate $dN_{M1}'$ is exceeded by the actual MG1 rotation speed change rate $dN_{M1}$ when the engine 18 is rotationally driven, for example. If the determination at SB20 is positive, at SB30 corresponding to the hybrid control means 82, the drive command value to the first electric motor MG1 is output such that the MG1 torque $T_{M1}$, for example, the cranking torque $T_{M1}cr$ of the first electric motor MG1 is turned to zero, for example. On the other hand, if the determination at SB20 is negative, at SB40 also corresponding to the hybrid control means 82, the normal control at the start of the engine is continued, in which the MG1 rotation speed command value is set to the predetermined cranking time MG1 rotation speed change rate $dN_{M1}cr$ to rotationally drive the engine 18, for example.

As described above, according to this embodiment, for example, in addition to the effect of the embodiment described above, when the engine is started by the hybrid control means 82, if the torque limiter device 28 is in operation, the MG1 torque $T_{M1}$ (cranking torque $T_{M1}cr$) for rotationally driving the engine 18 is reduced toward zero and, therefore, for example, although the separation of the first electric motor MG1 from the engine inertia may cause the runaway of the first electric motor MG1 if the torque limiter device 28 is activated in association with engine explosion (ignition) at the start of the engine when the engine 18 is rotationally driven by the first electric motor MG1, the reduction of the MG1 torque $T_{M1}$ toward zero suppresses the runaway of the first electric motor MG1 and unnecessary power consumption is suppressed in the electric storage device 68 supplying electric power to the first electric motor MG1 for generating the cranking torque $T_{M1}cr$.

According to the present embodiment, at the start of the engine, the operation of the torque limiter device 28 is determined based on whether the predetermined MG1 rotation speed change rate dNa is exceeded by the actual MG1 rotation speed change rate $dN_{M1}$ when the engine 18 is rotationally driven; if the operation of the torque limiter device 28 is determined, the MG1 torque $T_{M1}$ is reduced toward zero; and therefore, for example, as compared to the case of determining the operation of the torque limiter device 28 based on the estimated rotation speed difference $\Delta$Nes between the actual MG1 rotation speed $N_{M1}$ and the estimated MG1 rotation speed $N_{M1}$es calculated from a correlation equation as expressed by Equation (1), i.e., for example, as compared to the determination of the operation using signals indicative of the actual engine rotation speed $N_E$ and the MG2 rotation speed $N_{M2}$ exchanged through multiplex communication (e.g., communication between microcomputers repeating transmission/reception every few tens to hundreds of mS), the operation can be determined by using the signal concluded by only the first electric motor MG1, resulting in earlier determination of the operation of the torque limiter device 28. Therefore, the runaway of the first electric motor MG1 is further suppressed and the unnecessary power consumption is further suppressed in the electric storage device 68 supplying electric power to the first electric motor MG1.

Although the embodiments of the present invention have been described in detail with reference to the drawings, the present invention is applied in other forms.

For example, although the transmission mechanism 14 including the planetary gear device 26 (differential mechanism) is exemplarily illustrated as the power transmission device 12 making up the vehicle 10 to which the present invention is applied in the embodiments, this is not limitation and the present invention is applicable to any vehicle power transmission devices including the torque limiter device 28 and the first electric motor MG1 coupled to one of the cover member 50 and the plate member 58 of the torque limiter device 28 in a power transmittable manner. For example, the present invention is applicable even to a vehicle power transmission device configured such that the torque limiter device 28 is disposed to a power transmission path between a drive force source and a transmission mechanism in series with the first electric motor MG1 coupled to a power transmission path between the drive force source and the torque limiter device 28 in a power transmittable manner. This transmission mechanism is assumed to be, for example, a planetary gear type automatic transmission, a belt type continuously variable transmission, and a traction type continuously variable transmission. The vehicle power transmission device may be configured such that the second electric motor MG2 acting as an electric motor for running is additionally included on the output side of such a transmission mechanism, for example. In the case of such a vehicle power transmission device, unlike the case of including the planetary gear device 26, the first electric motor MG1 is operated to suppress the rotation speed difference $\Delta$N during operation of the torque limiter device 28 without separating the inertia of the drive force source; however, a certain effect of the present invention, i.e., the suppression of the generated heat quantity of the friction heat generated during operation of the torque limiter device 28 can be acquired.

Although the torque limiter device 28 is disposed between the first electric motor MG1 and the planetary gear device 26 (the second rotating element RE2 (sun gear S)) in the embodiments, the torque limiter device 28 may be disposed between the engine 18 and the planetary gear device 26 (the first rotating element RE1 (carrier CA)), for example. In such a case, although the effect of reducing the engine torque $T_E$ input to the torque limiter device 28 due to the effect of the planetary gear device 26 cannot be acquired, a certain effect of the present invention, i.e., the suppression of the generated heat quantity of the friction heat generated during operation of the torque limiter device 28 can be acquired.

Although the transmission mechanism 14 includes the planetary gear device 26 as the differential mechanism in the embodiments, the transmission mechanism may include as the differential mechanism, for example, a differential gear device having a pinion rotationally driven by the engine 18 and a pair of bevel gears engaging with the pinion operably coupled to the first electric motor MG1 and the output gear 30, instead of the planetary gear device 26. Although the planetary gear device 26 is a single planetary type, the planetary gear device 26 may be a double planetary type.

Although the planetary gear device 26 has the first rotating element RE1 coupled to the engine 18 in a power transmittable manner as the carrier CA, the second rotating element RE2 coupled via the torque limiter device 28 to the first electric motor MG1 in a power transmittable manner as the sun gear S, and the third rotating element RE3 coupled to the drive wheels 40 in a power transmittable manner as the ring gear R in the embodiments, such a form may not necessarily be achieved. For example, the first rotating element RE1 may be the sun gear S and the second rotating element RE2 may be the carrier CA. In other words, the engine 18 may perform input to the sun gear S and the first electric motor MG1 may perform input to the carrier CA. In short, the present invention is applicable as long as the engine 18 and the first electric motor MG1 are coupled such that the planetary gear device 26 is allowed to function as the differential mechanism.

Although the second electric motor MG2 is directly coupled to the output gear 30 in the embodiments, the coupling position of the second electric motor MG2 is not limited to this position and the second electric motor MG2 may indirectly be coupled via a transmission, a planetary gear device, an engagement device, etc. The second electric motor MG2 may not necessarily be included and the present invention is applicable as long as the first electric motor MG1 is included.

The described embodiments are merely exemplary embodiments and the present invention may be implemented in variously modified and improved forms based on the knowledge of those skilled in the art.

DESCRIPTION OF REFERENCE NUMERALS

12: vehicle power transmission device
18: engine (drive force source)
26: planetary gear set (differential mechanism)
28: torque limiter device
40: drive wheels
50: cover member (one of the first rotating member and the second rotating member)
58: plate member (the other of the first rotating member and the second rotating member)
80: electronic control device (control device)
MG1: first electric motor (electric motor)
MG2: second electric motor (electric motor for running)
RE1: first rotating element
RE2: second rotating element
RE3: third rotating element
S: sun gear
CA: carrier
R: ring gear

The invention claimed is:

1. A control device of a vehicle power transmission device comprising: a torque limiter device blocking transmission of a torque amount exceeding a predetermined torque with operation involving differential rotation between a first rotating member and a second rotating member; and an electric motor coupled to one of the first rotating member and the second rotating member in a power transmittable manner; and a differential mechanism including three rotating elements of a first rotating element coupled to a drive force source in a power transmittable manner, a second rotating element coupled to the electric motor in a power transmittable manner, and a third rotating element coupled to drive wheels in a power transmittable manner, wherein
the torque limiter device is disposed between the electric motor and the second rotating element, and wherein
when a rotation speed difference is generated between the first rotating member and the second rotating member due to the operation of the torque limiter device, the electric motor is operated so as to suppress the rotation speed difference.

2. The control device of a vehicle power transmission device of claim 1, wherein
the operation of the torque limiter device is determined based on a rotation speed difference between an actual rotation speed of the electric motor and a rotation speed of the second rotating element calculated from correlation of rotation speeds of the first to third rotating elements, and wherein
if the operation of the torque limiter device is determined, the electric motor is operated such that the actual rotation speed of the electric motor is varied to the calculated rotation speed of the second rotating element.

3. The control device of a vehicle power transmission device of claim 1, further comprising an electric motor for running coupled to the drive wheels in a power transmittable manner, wherein
when the electric motor is operated so as to suppress the rotation speed difference, output of the electric motor for running is suppressed.

4. The control device of a vehicle power transmission device of claim 2, further comprising an electric motor for running coupled to the drive wheels in a power transmittable manner, wherein
when the electric motor is operated so as to suppress the rotation speed difference, output of the electric motor for running is suppressed.

5. The control device of a vehicle power transmission device of claim 1, wherein the differential mechanism is a planetary gear device having three rotating elements of a sun gear, a carrier, and a ring gear, and wherein the three rotating elements are the first to third rotating elements.

6. The control device of a vehicle power transmission device of claim 2, wherein the differential mechanism is a planetary gear device having three rotating elements of a sun gear, a carrier, and a ring gear, and wherein the three rotating elements are the first to third rotating elements.

7. The control device of a vehicle power transmission device of claim 3, wherein the differential mechanism is a planetary gear device having three rotating elements of a sun gear, a carrier, and a ring gear, and wherein the three rotating elements are the first to third rotating elements.

8. The control device of a vehicle power transmission device of claim 1, wherein the differential mechanism has a differential state controlled by controlling an operating state of the electric motor.

9. The control device of a vehicle power transmission device of claim 2, wherein the differential mechanism has a differential state controlled by controlling an operating state of the electric motor.

10. The control device of a vehicle power transmission device of claim 3, wherein the differential mechanism has a differential state controlled by controlling an operating state of the electric motor.

11. The control device of a vehicle power transmission device of claim 1, wherein the drive force source is an engine, wherein the electric motor has a function as a starting motor rotationally driving the engine during start of the engine, wherein if the torque limiter device is in operation during the start of the engine, an output torque of the electric motor for rotationally driving the engine is reduced toward zero.

12. The control device of a vehicle power transmission device of claim 2, wherein the drive force source is an engine, wherein the electric motor has a function as a starting motor rotationally driving the engine during start of the engine, wherein if the torque limiter device is in operation during the start of the engine, an output torque of the electric motor for rotationally driving the engine is reduced toward zero.

13. The control device of a vehicle power transmission device of claim 3, wherein the drive force source is an engine, wherein the electric motor has a function as a starting motor rotationally driving the engine during start of the engine, wherein if the torque limiter device is in operation during the start of the engine, an output torque of the electric motor for rotationally driving the engine is reduced toward zero.

14. The control device of a vehicle power transmission device of claim 11, wherein during the start of the engine, the operation of the torque limiter device is determined based on whether a predetermined value is exceeded by an actual value of a rotation speed change rate of the electric motor when the engine is rotationally driven by the electric motor, and wherein if the operation of the torque limiter device is determined, the output torque of the electric motor is reduced toward zero.

* * * * *